(12) United States Patent
Li et al.

(10) Patent No.: US 11,776,525 B1
(45) Date of Patent: Oct. 3, 2023

(54) SYSTEMS AND METHODS FOR MACHINE LEARNING BASED ACTIVE METASURFACES FOR FLEXURAL AND/OR LONGITUDINAL WAVE CONTROL AND HARMONICS GENERATION

(71) Applicant: Toyota Motor Engineering & Manufacturing North America, Inc., Plano, TX (US)

(72) Inventors: Xiaopeng Li, Ann Arbor, MI (US); Ziqi Yu, Ann Arbor, MI (US); Danil V. Prokhorov, Canton, MI (US); Taehwa Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/941,151

(22) Filed: Sep. 9, 2022

(51) Int. Cl.
*G10K 11/178* (2006.01)
*G05B 13/02* (2006.01)

(52) U.S. Cl.
CPC ........ *G10K 11/1785* (2018.01); *G05B 13/027* (2013.01)

(58) Field of Classification Search
CPC .......................... G10K 11/1785; G05B 13/027
See application file for complete search history.

(56) References Cited

U.S. PATENT DOCUMENTS

| 4,308,751 | A | 1/1982 | Thurner et al. |
| 2016/0109412 | A1 | 4/2016 | Borigo et al. |
| 2021/0327403 | A1 | 10/2021 | Huang et al. |
| 2022/0244221 | A1* | 8/2022 | Li ..................... G01N 29/4481 |

FOREIGN PATENT DOCUMENTS

WO          2022061469 A1      3/2022

OTHER PUBLICATIONS

Chen (Broadband, reconfigurable and multifunctional elastic wave control with smart metamaterials—Dec. 2017) (Year: 2017).*

(Continued)

*Primary Examiner* — David L Ton
(74) *Attorney, Agent, or Firm* — Christopher G. Darrow; Darrow Mustafa PC

(57) ABSTRACT

A wave control system includes a substrate with a plurality of beams spaced apart from each other, a plurality of sensors disposed on the plurality of beams, a plurality of actuators disposed on the plurality of beams, a processor, and a memory communicably coupled to the processor. The memory stores machine-readable instructions that, when executed by the processor, cause the processor to determine a frequency of a fundamental incident wave propagating within and/or incident on the plurality of beams based on a plurality of signals from the plurality of sensors, and control the plurality of actuators to generate at least one of a cancellation wave, a subharmonic wave, and a superharmonic wave, based on the frequency of the fundamental incident wave. In addition, a reflected fundamental wave, the sub harmonic wave, and/or the superharmonic wave can be steered to a desired direction or path along the substrate.

20 Claims, 6 Drawing Sheets

(56) References Cited

OTHER PUBLICATIONS

Chen et al., "Enhanced flexural wave sensing by adaptive gradient-index metamaterials," Scientific Reports, vol. 6, Oct. 17, 2016, pp. 1-11.

Julien Leng, "Controlling flexural waves using subwavelength perfect absorbers: application to Acoustic Black Holes," Acoustics [physics.class-ph], Université du Maine, 2019, pp. 1-142.

Beck et al., "Experimental analysis of a cantilever beam with a shunted piezoelectric periodic array," Journal of Intelligent Material Systems and Structures, SAGE Publications, 2011, vol. 22, issue 11, pp. 1177-1187.

Wang et al., "Multi-resonant piezoelectric shunting induced by digital controllers for subwavelength elastic wave attenuation in smart metamaterial," Smart Materials and Structures, vol. 26, No. 2, 2017, pp. 1-20.

Guo et al., "Manipulating acoustic wave reflection by a nonlinear elastic metasurface," Journal of Applied Physics, vol. 123, issue 12, 2018, pp. 1-11.

Fang et al., "Wave propagation in a nonlinear acoustic metamaterial beam considering third harmonic generation," New Journal of Physics, vol. 20, Dec. 2018, pp. 1-16.

Spencer et al., "An Adaptive Neurocontroller for Vibration Suppression and Shape Control of a Flexible Beam," Journal of Intelligent Material Systems and Structures, vol. 9, issue 3, Mar. 1, 1998, pp. 160-170.

Wang et al., "Adaptive vibration control for a cantilevered beam using actuating and sensing functions of a piezoelectric bimorph," JVE Journals, vol. 20, Oct. 19, 2018, pp. 87-90.

\* cited by examiner

SYSTEMS AND METHODS FOR MACHINE LEARNING BASED ACTIVE METASURFACES FOR FLEXURAL AND/OR LONGITUDINAL WAVE CONTROL AND HARMONICS GENERATION

TECHNICAL FIELD

The present disclosure relates generally to flexural, longitudinal, and/or acoustic waves, and particularly to control of flexural, longitudinal, and/or acoustic waves.

BACKGROUND

Sound radiation (i.e., noise) is typically the result of flexural, also known as bending waves, propagating across a surface of structure, and deforming the structure transversely to the surface. In addition, longitudinal waves, i.e., waves vibrating in the direction of propagation, are the main type or source of propagating waves in solid and/or fluid media.

Traditional solutions for absorbing flexural waves and/or longitudinal waves include using dampening materials or nonlinear materials. However, these solutions reduce the bending stiffness of a structure and/or add additional mass to the structure. In addition, traditional solutions fail to absorb low frequency flexural and/or longitudinal waves such that different and/or broad frequency domains are absorbed.

The present disclosure addresses issues related to flexural and/or longitudinal wave absorption, and other issues related to flexural and/or longitudinal waves.

SUMMARY

This section provides a general summary of the disclosure and is not a comprehensive disclosure of its full scope or all of its features.

In one form of the present disclosure, a wave control system includes a substrate with a plurality of beams spaced apart from each other, a plurality of sensors disposed on the plurality of beams, a plurality of actuators disposed on the plurality of beams, a processor, and a memory communicably coupled to the processor. The memory stores machine-readable instructions that, when executed by the processor, cause the processor to determine a frequency of a fundamental incident wave propagating in the plurality of beams based on a plurality of signals from the plurality of sensors, and control the plurality of actuators to generate a cancellation wave, a subharmonic wave, and/or a superharmonic wave, based on the frequency of the fundamental incident waves.

In another form of the present disclosure, a method of controlling waves propagating within and/or incident on a structure includes detecting, with a plurality of sensors attached to a plurality of beams, a fundamental incident wave in the plurality of beams, determining, based on signals from the plurality of sensors generated in response to the fundamental incident wave, a frequency of the fundamental incident wave, and controlling a plurality of actuators connected to the plurality of beams to generate a cancellation wave, a subharmonic wave, and/or a superharmonic wave, based on the frequency of the fundamental incident wave.

In still another form of the present disclosure, a non-transitory computer-readable medium for controlling waves propagating within or incident on a structure, includes instructions that, when executed by one or more processors, cause the one or more processors to detect, with a plurality of sensors attached to a plurality of beams, a fundamental incident wave propagating in the plurality of beam. The instructions that, when executed by one or more processors, also cause the one or more processors to determine, based on signals from the plurality of sensors generated in response to the fundamental incident wave, a frequency of the fundamental incident wave, and control a plurality of actuators connected to the plurality of beams to generate a cancellation wave, a subharmonic wave, and/or a superharmonic wave, based on the frequency of the fundamental incident wave.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present disclosure provides a wave control system for control of flexural, longitudinal, and/or acoustic waves. The wave control system includes a plurality of metasurfaces disposed on a plurality of beams and a controller in communication with the plurality of metasurfaces. The wave control system is configured to convert a fundamental wave (also known as a "first harmonic wave" into a subharmonic and/or a superharmonic wave. That is, the controller is configured to determine a frequency of an incident fundamental wave propagating along at least one of the plurality of beams and control at least a subset of the plurality of metasurfaces to generate a subharmonic wave and/or superharmonic wave (of the fundamental incident wave). As used herein, the phrase "subharmonic wave" refers to a generated wave having an integer submultiple (e.g., ½, ⅓, ¼) of the frequency of a fundamental incident wave and the phrase "superharmonic wave" refers to a generated wave having an integer multiple (e.g., 2, 3, 4) of the frequency of a fundamental incident wave. In some variations, the controller is configured to control at least a subset of the plurality of metasurfaces to generate a cancellation wave, and in at least one variation the controller is configured to control at least a subset of the plurality of metasurfaces to steer the generated subharmonic and/or superharmonic wave to a desired direction or path on or along the substrate. Accordingly, the teachings of the present disclosure provide for control of a broad bandwidth of flexural, longitudinal, and/or acoustic waves. In addition, the teachings of the present disclosure provide for acoustic and/or vibration suppression by generating a cancellation wave.

Figure 1A:
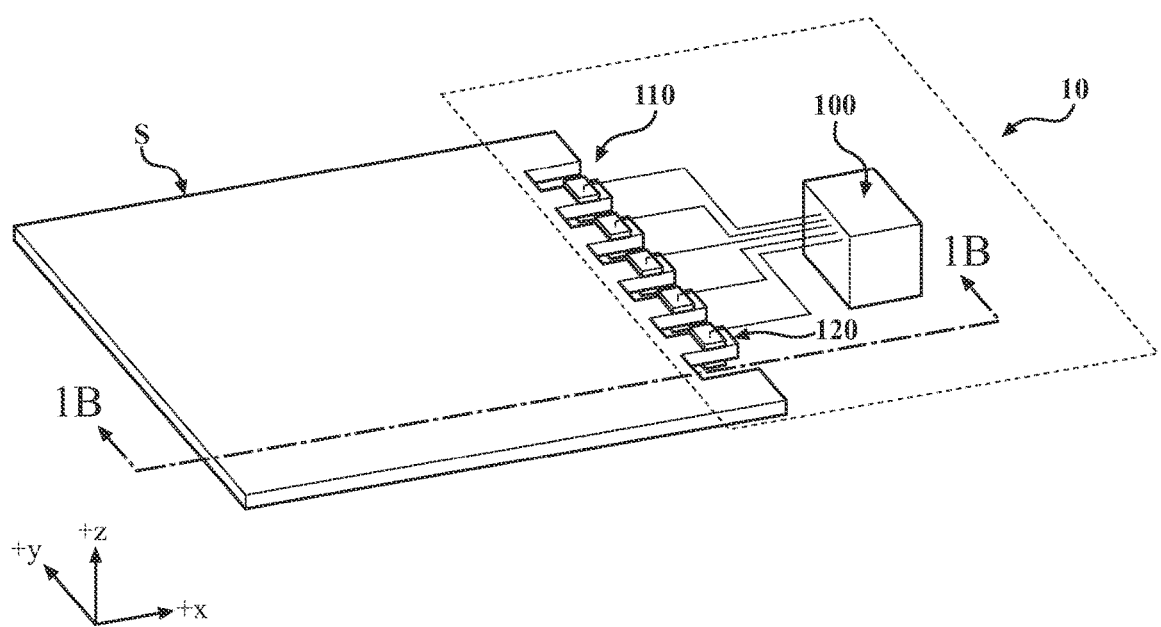
FIG. 1A shows a perspective view of a wave control system according to one form of the present disclosure.
Figure 1B:
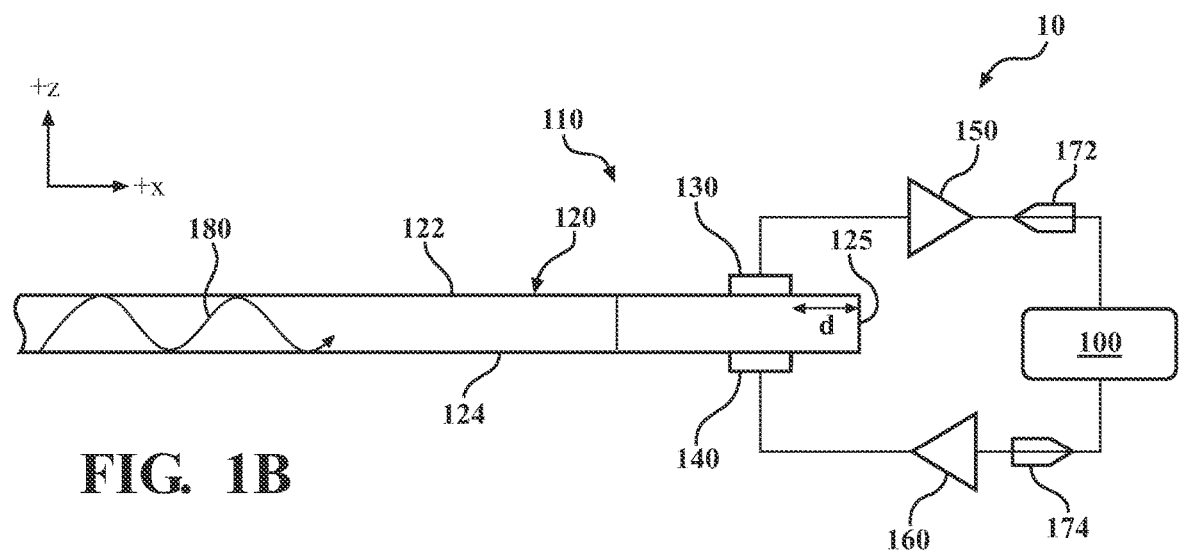
FIG. 1B shows the section labeled 1B-1B of the wave control system in FIG. 1A with a fundamental incident wave propagating along a beam of the wave control system.

Referring to FIGS. 1A and 1B, a perspective view of a wave control system 10 according to one form of the present disclosure is shown in FIG. 1A and section 1B-1B in FIG. 1A is shown in FIG. 1B. The wave control system 10 includes a controller 100 in communication with a plurality of metasurfaces 110. In some variations, each of the plurality of metasurfaces 110 includes a beam 120, a sensor 130 (e.g., a first piezoelectric patch), and an actuator 140 (e.g., a second piezoelectric patch). The sensors 130 and the actuators 140 are in mechanical communication with (e.g., rigidly attached to) the plurality of beams 120 and the controller 100 is in electrical communication with each of the sensors 130 and each of the actuators 140.

The plurality of beams 120 can be in mechanical communication with a substrate 'S' (e.g., a plate or sheet). In some variations, the plurality of beams 120 are integral with the substrate S. That is, the substrate S and the plurality of beams 120 are formed from the same piece of material such that there is no adhesive and/or weld interface therebetween. In other variations, the plurality of beams 120 are not integral with the substrate S. That is, the plurality of beams 120 are added or attached to the substrate S, e.g., using an adhesive, by welding, and the like. And although the figures illustrate a mechanical structure in the form of beams 120, the mechanical structure may be a pipe, other types of waveguides, or other structure that can be subject to transmitting waves.

The system 10 can include a charge amplifier 150, a voltage amplifier 160, an analog-to-digital converter (ADC) 172, and a digital-to-analog converter (DAC) 174. And while FIG. 1B illustrates the charge amplifier 150, the voltage amplifier 160, the ADC 172, and the DAC 174 as being separate from the controller 100, in some variations the charge amplifier 150, the voltage amplifier 160, the ADC 172, and/or the DAC 174 is/are contained within in or are part of the controller 100.

In some variations, the sensor 130 is disposed on a first surface 122 of the beam 120 and the actuator 140 is disposed on a second surface 124 of the beam 120. For example, in at least one variation, the sensor 130 is attached to and in mechanical communication with an upper (+z direction) surface of the beam 120 and the actuator 140 is attached to and in mechanical communication with a lower (−z direction) surface of the beam 120. However, it should be understood that the sensor 130 and the actuator 140 can be on the same surface of the beam 110.

In some variations, the sensor 130 and the actuator 140 are disposed on the beam 110 proximal to a distal end 125 of the beam 120, and in such variations the sensor 130 and the actuator 140 can be spaced apart from the distal end 125 by a distance 'd'.

Figure 2:
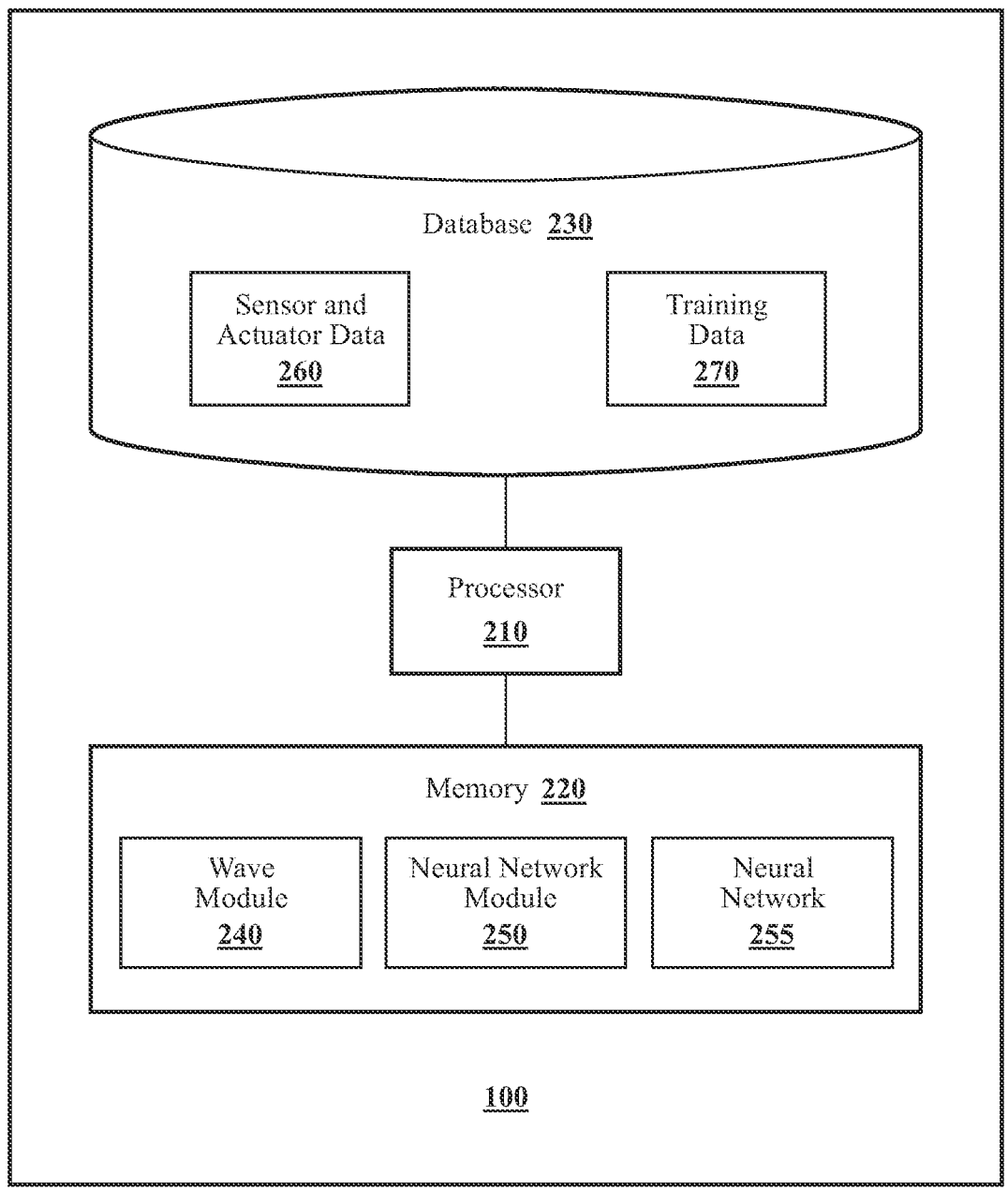
FIG. 2 shows a block diagram for the controller in FIG. 1A.

Referring to FIG. 2, a block diagram of the controller 100 shown. The controller 100 can include a processor 210, a memory 220, and a database 230. The processor 210 may be a part of the controller 100, the controller 100 may include a separate processor from the processor 210 of the wave control system 10 or the controller 100 may access the processor 210 through a data bus or another communication path.

The memory 220 stores a wave module 240, a neural network module 250, and a neural network 255. That is, the memory 220, provides for machine learning (ML) of a wave control process and the wave control system 10 can be a ML wave control system as described in greater detail below. The memory 220 can be constructed as a random-access memory (RAM), read-only memory (ROM), a hard-disk drive, a flash memory, or other suitable memory for storing the wave module 240, neural network module 250, and neural network 255. The wave module 240 and neural network module 250 are, for example, constructed as computer-readable instructions that when executed by the processor 210 cause the processor 210 to perform the various functions disclosed herein.

The wave module 240 is generally constructed including instructions that function to control the processor 210 to determine a frequency of a fundamental incident wave 180 traveling in the beam 120 (FIG. 1B) based on a detection signal from the sensor 130, and control the actuator 140 to generate at least one of a subharmonic wave, a superharmonic wave, and a cancellation wave based on the frequency of the fundamental incident wave 180 and/or a user command. In some variations, generation of the at least one of a subharmonic wave, a superharmonic wave, and a cancellation wave reduces a coefficent of reflection of the fundamental incident wave 180. In at least one variation, the wave module 240 includes instructions that function to control the processor 210 to control the actuator 140 to steer the generated subharmonic wave, superharmonic wave, and/or cancellation wave to a desired direction using generalized Snell's law. And in some variations, the wave module 240 includes instructions that function to control the processor 210 to control the actuator 140 to generate a fundamental wave to cancel the fundamental incident wave (i.e., the cancellation wave).

The neural network module 250 is generally constructed including instructions that function to control the processor 210 to input a feedback (sensing) signal from the sensor 130 into the neural network 255, which in response outputs a signal to control the actuator 140 to generate the subharmonic wave, the superharmonic wave, and/or the cancellation wave. The feedback signal can indicate multiple wave components present in the beam 120, including wave components of the fundamental incident wave 180, a generated subharmonic wave, a generated superharmonic wave, a generated cancellation wave, and/or a reflected wave that results from the fundamental incident wave reflected from the distal end 125 of the beam 120. In some variations, the neural network module 250 includes instructions that function to control the processor 210 to add a time delay to inputs to the neural network 255 when utilizing the neural network to predict a voltage to apply to the actuator(s) 140 in order to generate the subharmonic wave, the superharmonic wave, and/or the cancellation wave.

In order to generate the subharmonic wave, superharmonic wave, and/or cancellation wave, in some variations the neural network module 250 trains the neural network 255 (e.g., updates or revises coefficients of the neural network 255) across a broad bandwidth of frequencies to determine a transfer function between the actuator 130 and the sensor 120, as will be discussed further below.

The database 230 stores, among other things, sensor and actuator data 260 (e.g., data obtained from the sensor 130 and the actuator 140) and training data 270 (e.g., time-series data generated to train the neural network 255). In some variations, the database 230 is constructed as an electronic data structure stored in the memory 220 or another data store, such as a cloud-based storage, a removable memory device, or another suitable location that is accessible to a wave module 240 and/or a neural network module 250. The database 230 is configured with routines that can be executed by the processor 210 for analyzing stored data, providing stored data, organizing stored data, and so on. And in at least one variation, the database 230 stores data described above (as well as other data) used by the wave module 240 and the neural network module 250 in executing various functions.

Figure 3:
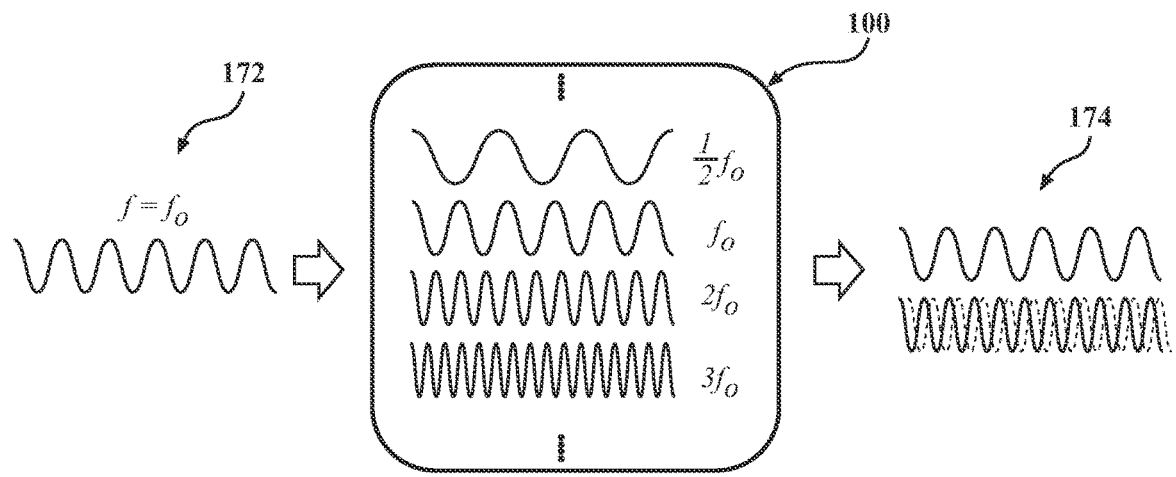
FIG. 3 illustrates the controller in FIG. 2 receiving a fundament incident wave signal and generating a subharmonic wave, a superharmonic wave, and/or a cancellation wave according to the teachings of the present disclosure.

Referring to FIG. 3, a diagram illustrating operation of the controller 100 according to the teachings of the present disclosure is shown. The controller 100 receives a fundamental incident wave signal detected by the sensor 130 and converted to a digital signal by the ADC 172, and outputs (generates) a digital signal converted to an analog signal by the ADC 174. The analog signal is provided to the actuator 140 and the beam 120 is actuated based on the signal output from the controller 100. In some variations, the controller 100 functions as a ML controller that is robust and approximates any desired control algorithm. For example, in at least one variation a frequency of a fundamental incident wave 180 is fed or provided to the controller 100, and based on machine learning and/or a user request/command, the controller 100 generates a subharmonic wave signal and/or superharmonic wave, and in some variations, the controller 100 generates a fundamental wave that cancels (i.e., a cancellation wave) the fundamental incident wave 180 such that only the generated subharmonic wave signal and/or superharmonic wave appear as reflected. In addition, in at least one variation the controller 100 controls the phase of the subharmonic wave, superharmonic wave, and/or cancellation wave at 271 range of the subharmonic wave and/or superharmonic wave such that a linear or nonlinear phase profile for steering of the subharmonic wave, superharmonic wave, and/or cancellation wave to a desired direction via the generalized Snell's law is provided.

Referring to FIGS. 4A-4D, stages of the wave control system 10 detecting and responding to a fundamental incident wave 180 propagating through one of the beams 120 are shown. And while FIGS. 4A-4D only sow one beam 120, it should be understood that the wave control system 10 is configured to perform the functions described below when the fundamental incident wave 180 is propagating through more than one of the beams 120. In addition, it should be understood that the fundamental incident wave can be a flexural wave propagating along the substrate S and the beam(s) 120, a longitudinal wave propagating along the substrate S and the beam(s) 120, and/or an acoustic wave incident on the substrate S and the beam(s) 120.

Figure 4A:
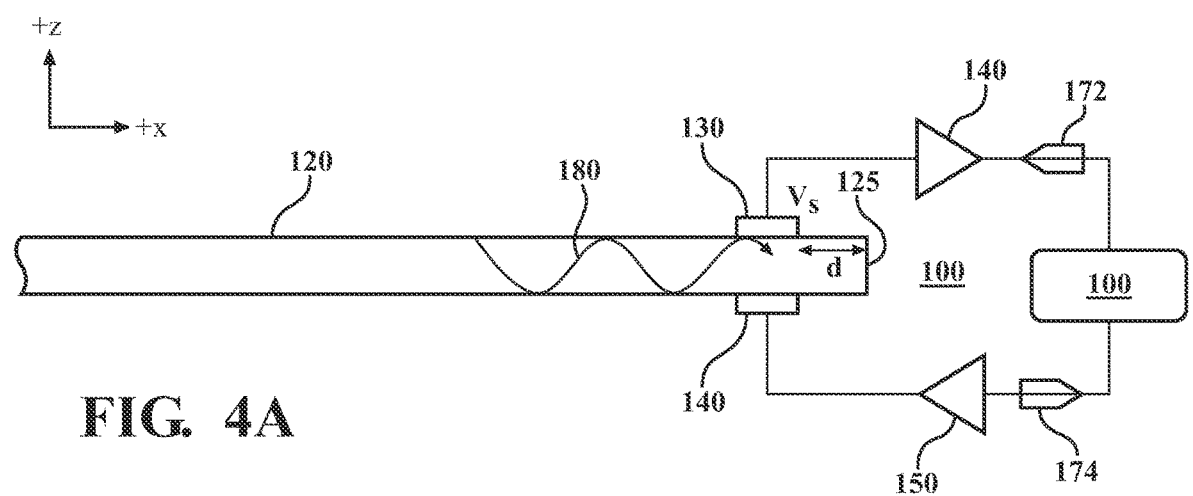
FIG. 4A shows the section of the wave control system in FIG. 1B with a fundamental incident wave propagating along the beam of the wave control system and being detected by a sensor.

As shown in FIG. 4A, in some variations the sensor 130 generates a voltage signal $V_s$ in response to the fundamental incident wave 180. For example, the charge amplifier 150 converts charges to a sensing voltage $V_s$ and the ADC 172 converts the sensing voltage $V_s$ to a digital signal and transmits the digital signal to the controller 100. The wave module 240 can store the digital signal as sensor and actuator data 260. And based on the sensor and actuator data 260, in a relatively brief period of time the wave module 240 can determine a frequency of the fundamental incident wave 180 and a frequency for a generated subharmonic wave, superharmonic wave and/or a cancellation wave.

Figure 4B:
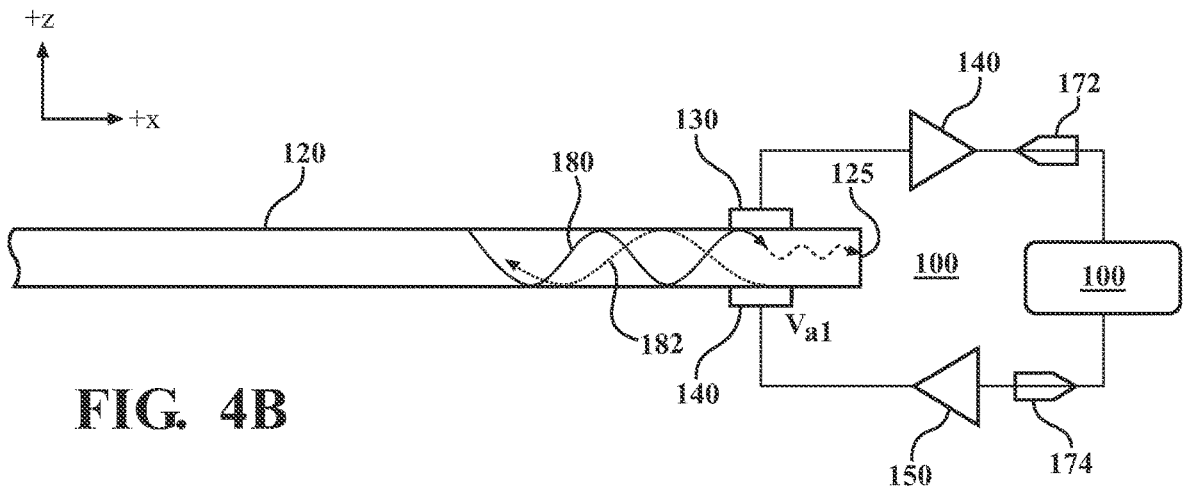
FIG. 4B shows the section of the wave control system in FIG. 4A with a subharmonic wave being generated by an actuator according to the teachings of the present disclosure.
Figure 4C:
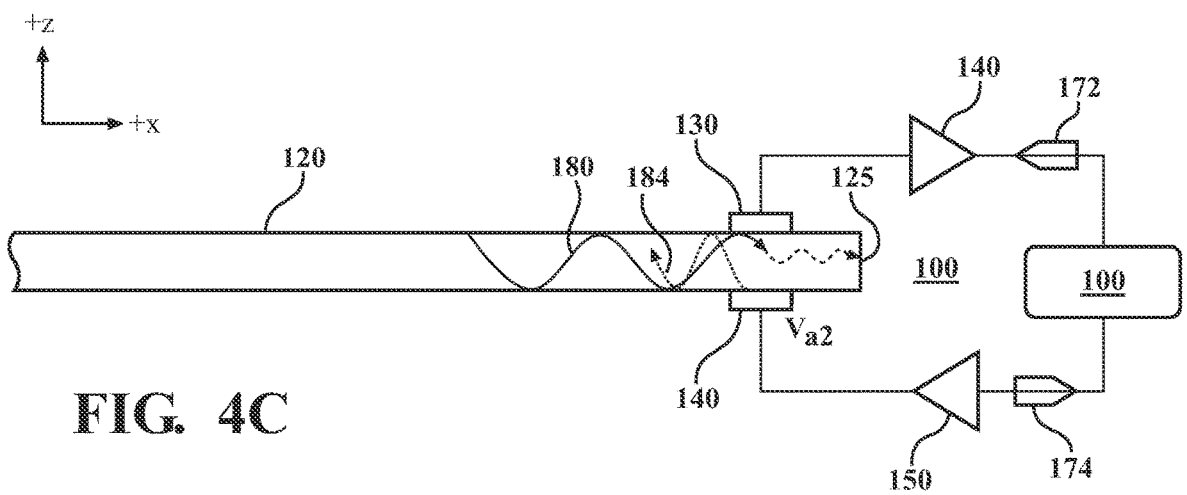
FIG. 4C shows the section of the wave control system in FIG. 4A with a superharmonic wave being generated by an actuator according to the teachings of the present disclosure.
Figure 4D:
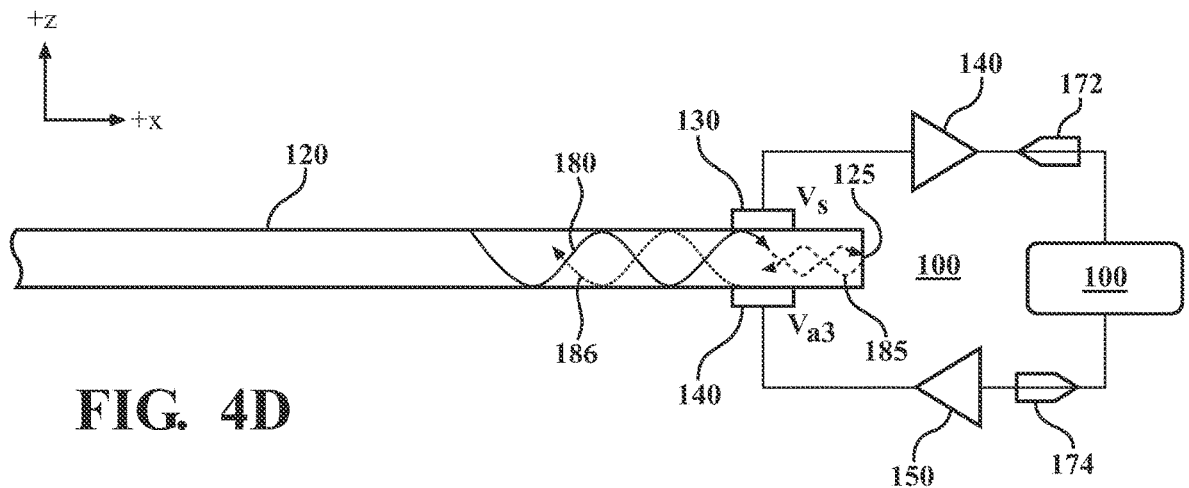
FIG. 4D shows the section of the wave control system in FIG. 4A with a multi-component feedback signal being detected by a sensor and a cancellation wave being generated by an actuator according to the teachings of the present disclosure.

As shown in FIGS. 4B-4C, in some variations, and in response to detecting the fundamental incident wave 180, the wave module 240 generates a voltage $V_{a1}$, based on $V_s$, at a timing to generate a subharmonic wave 182 (FIG. 4B) and/or a superharmonic wave 184 (FIG. 4C. In the alternative, or in addition to, in some variations, and in response to detecting the fundamental incident wave 180, the wave module 240 generates a voltage $V_{a3}$, based on $V_s$, at a timing to generate the cancellation wave 186 having an equal or nearly equal amplitude as the incident wave and an opposite phase as shown in FIG. 4D. The cancellation wave 186 counters the fundamental incident wave 180 as it continues toward the end of the beam 175 and thereby reduces the reflection coefficient of the fundamental incident wave 180.

It should be understood that in some variations, and in response to detecting the fundamental incident wave 180, the wave module 240 generates voltages $V_a$, based on $V_s$, at a timing to generate more than one type of wave, i.e., not just the subharmonic wave 190, the superharmonic wave 192, or the cancellation wave 194. For example, in some variations, and in response to detecting the fundamental incident wave 180, the wave module 240 generates a first voltage $V_{a1}$ (not shown in figures) and a second voltage $V_{a2}$ (not shown in figures), based on $V_s$, at a timing to generate a subharmonic wave 190 and a superharmonic wave 192. In other variations, and in response to detecting the fundamental incident wave 180, the wave module 240 generates a first voltage $V_{a1}$ and a third voltage $V_{a3}$ (not shown in figures), based on $V_s$, at a timing to generate a subharmonic wave 190 and a cancellation wave 194. In at least one variation, and in response to detecting the fundamental incident wave 180, the wave module 240 generates a second voltage $V_{a2}$ and a third voltage $V_{a3}$, based on $V_s$, at a timing to generate a superharmonic wave 192 and a cancellation wave 194. And in some variations, and in response to detecting the fundamental incident wave 180, the wave module 240 generates a first voltage $V_{a1}$, a second voltage $V_{a2}$, and a third voltage $V_{a3}$, based on $V_s$, at a timing to generate a subharmonic wave 190, a superharmonic wave 192, and a cancellation wave 194.

As shown in FIG. 4D, the reduced fundamental incident wave 180 reflects off the distal end 125 of the beam 120 resulting in a reflected wave 185, which is not directly addressed by the subharmonic wave 190, the superharmonic wave 192, and/or the cancellation wave 194. Furthermore, after generation of the reflected wave 185, the sensor 130 outputs a signal influenced by multiple wave components present in the beam 120, including the fundamental incident wave 180, the subharmonic wave 190, superharmonic wave 192, the cancellation wave 194, and/or the reflected wave 185, and a near field evanescent wave (not shown), all of which may cause different responses at different frequency bands.

Figure 5:
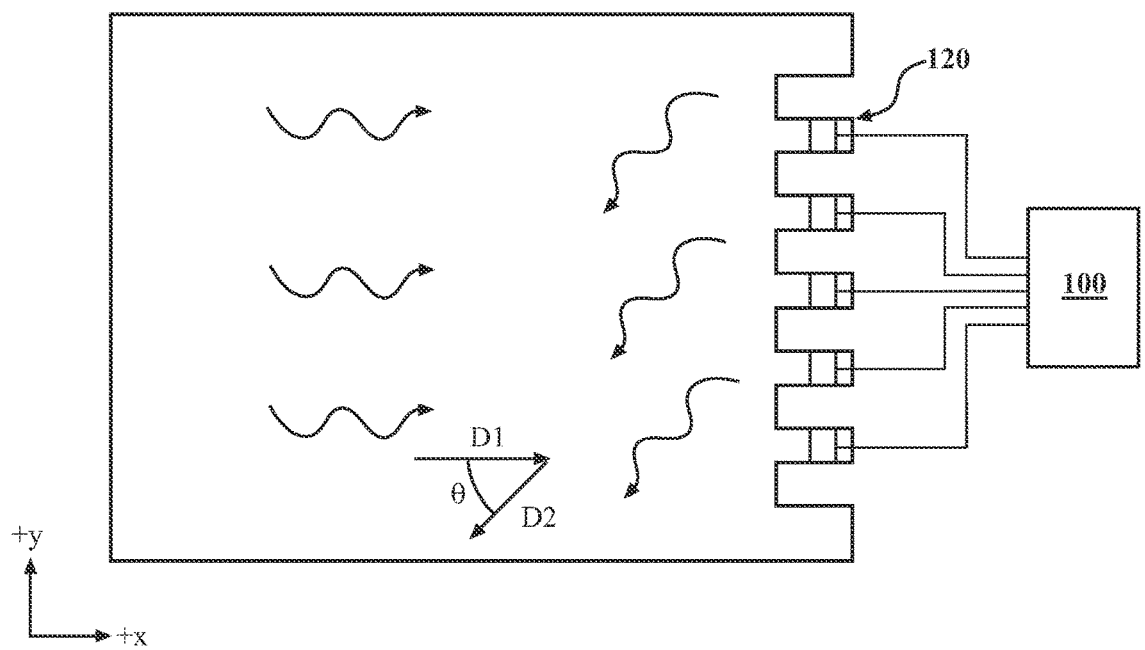
FIG. 5 shows a top view of the wave control system in FIG. 1 and an implementation scenario of the wave control system steering generated subharmonic and/or superharmonic waves to a desired direction or path.

Referring now to FIG. 5, a top view of the wave control system 10 is shown with the controller 100 steering fundamental incident waves 170 propagating towards and incident on the wave control system 10 at a direction 'D1' to a desired direction 'D2' at an angle θ to the incident direction D1 as steered waves 172. The controller 100 steers the fundamental incident waves 170 using or per generalized Snell's law. That is, according to the generalized Snell's law, $$\sin(\theta_r) - \sin(\theta_i) = \frac{1}{k_0}\frac{d\phi}{dx}$$

where $\theta_i$ and $\theta_r$ are the incident and reflected angels, respectively, $$\frac{d\phi}{dx}$$

is the phase gradient along the metasurface, and $k_o$ is the wavenumber in the host plate. Accordingly, and for example, modulating the reflected waves with a linear phase profile of $d\phi/dx=pi/25$ rad/mm from normal incidence ($\theta_i=0$), the reflected waves can be steered to about $0_r=45°$ for $k_0=44.3$.

Figure 6:
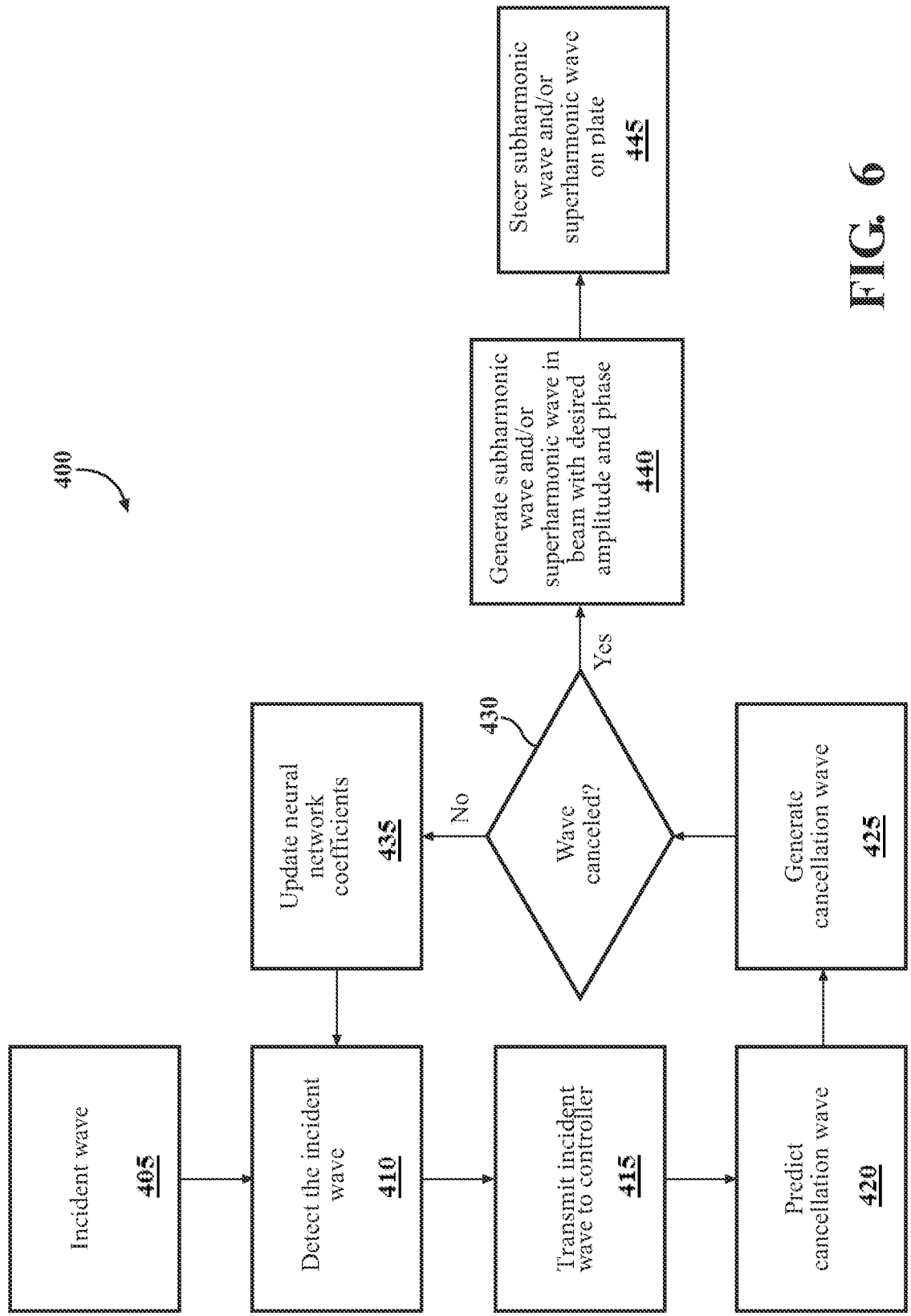
FIG. 6 is a flow chart for a method of controlling a flexural wave a longitudinal wave, and/or an acoustic wave according to the teachings of the present disclosure.

Referring to FIG. 6, a flowchart of a method 400 of controlling waves according to the teachings of the present disclosure is shown The method 400 will be discussed from the perspective of the wave control system 10 of FIGS. 1-5. And while the method 400 is discussed in combination with the wave control system 10, it should be understood that the method 400 is not limited to being implemented within the wave control system 10 and is but one example of a system that may implement the method 400.

At 410, with the wave control system 10 connected to the beam(s) 120, and in response to a fundamental incident wave 180 with a given frequency applied to or propagating along the beam(s) 120 at 405, the sensor(s) 130 detects the fundamental incident wave 180 at 410 and transmits a feedback signal to the controller 100 at 415. The controller 100 (e.g., the neural network module 250) predicts a cancellation wave 186 at 420 and instructs the actuator 140 to generate the cancellation wave 186 at 425. At 430, the controller 100 determines (at least in part from feedback signals from the sensor 130) if the fundamental incident wave 180 has been canceled. In the event the fundamental incident wave 180 has not been canceled, the method 400 proceeds to 435 where the controller 100 updates coefficients in the neural network 255 before returning to 410. The method 400 repeats this cycle, i.e., 410-415-420-425-430 until the controller 100 determines the fundamental incident wave 180 has been canceled. The method 400 then proceeds to 440 where the controller 100 commands and the actuator 140 executes generating a subharmonic and/or superharmonic wave with a defined amplitude and phase at 440. And at 445, the actuator 140 steers the subharmonic and/or superharmonic wave on the substrate as described above.

The wave control system 10 can include one or more modules, at least some of which are described herein. The modules can be implemented as computer-readable program code that, when executed by the processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, the database 230 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for conducting the methods described herein is suited. A typical combination of hardware and software can be a processing system with computer-usable program code that, when being loaded and executed, controls the processing system such that it conducts the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to conduct these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for conducting operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be conducted in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A wave control system, comprising:
   a substrate with a plurality of beams spaced apart from each other;
   a plurality of sensors disposed on the plurality of beams;
   a plurality of actuators disposed on the plurality of beams;
   a processor; and
   a memory communicably coupled to the processor and storing machine-readable instructions that, when executed by the processor, cause the processor to:
      determine a frequency of a fundamental incident wave propagating in the plurality of beams based on a plurality of signals from the plurality of sensors; and
      control the plurality of actuators to generate at least one of a cancellation wave, a subharmonic wave and a superharmonic wave, based on the frequency of the fundamental incident wave.

2. The wave control system according to claim 1, wherein the substrate comprises a first end, a second end spaced apart from the first end, and the plurality of beams are disposed at the second end.

3. The wave control system according to claim 1, wherein the plurality of sensors are disposed on a first surface of the plurality of beams and the plurality of actuators are disposed on a second surface of the plurality of beams.

4. The wave control system according to claim 3, wherein the second surface of the plurality of beams is different than the first surface of the plurality of beams.

5. The wave control system according to claim 1, further comprising a neural network module including instructions that when executed by the processor cause the processor to control the plurality of actuators to generate the at least one of the cancellation wave, the subharmonic wave and the superharmonic wave based on a plurality of feedback signals, from the plurality of sensors, that indicate multiple wave components present in the plurality of beams including the fundamental incident wave and a reflected wave resulting from the fundamental incident wave reflecting from a plurality of ends of the plurality of beams.

6. The wave control system according to claim 5, wherein the neural network module inputs the plurality of feedback signals into a neural network to predict a voltage $V_a$ to apply to the plurality of actuators to generate the at least one of the cancellation wave, the subharmonic wave and the superharmonic wave.

7. The wave control system according to claim 6, wherein the neural network module inputs the plurality of feedback signals into a neural network to predict a voltage $V_a$ to apply to the plurality of actuators to generate the cancellation wave.

8. The wave control system according to claim 7, wherein the memory stores machine-readable instructions that, when executed by the processor, cause the processor to revise coefficients in a neural network, predict another cancellation wave, and generate another cancellation wave.

9. The wave control system according to claim 8, wherein the memory stores machine-readable instructions that, when executed by the processor, cause the processor to control the plurality of actuators to generate at least one of the subharmonic wave and the superharmonic wave, based on the frequency of the fundamental incident wave, after generating the cancellation wave.

10. The wave control system according to claim 9, wherein the neural network module further includes instructions to add a time delay to inputs to the neural network when utilizing the neural network to predict the voltage $V_a$ to generate the at least one of the cancellation wave, the subharmonic wave and the superharmonic wave.

11. The wave control system according to claim 1, wherein the memory communicably coupled to the processor and storing machine-readable instructions, when executed by the processor, cause the processor to steer the at least one of the cancellation wave, the subharmonic wave, and the superharmonic wave to a desired direction.

12. The wave control system according to claim 11, wherein the desired direction is different than an incident direction of the fundamental incident wave.

13. A method of controlling waves, comprising:
   detecting, with a plurality of sensors attached to a plurality of beams, a fundamental incident wave in the plurality of beams;
   determining, based on signals from the plurality of sensors generated in response to the fundamental incident wave, a frequency of the fundamental incident wave; and
   controlling a plurality of actuators connected to the plurality of beams to generate at least one of a cancellation wave, a subharmonic wave, and a superharmonic wave, based on the frequency of the fundamental incident wave.

14. The method according to claim 13, further comprising:
   controlling the plurality of actuators to steer at least one of the cancellation wave, the subharmonic wave, and the superharmonic wave to a desired direction.

15. The method according to claim 14, wherein the desired direction is different than an incident direction of the fundamental incident wave.

16. The method according of claim 13, further comprising generating at least one of the subharmonic wave and the superharmonic wave, based on the frequency of the fundamental incident wave, after generating the cancellation wave.

17. The method of claim 13, further comprising adding a time delay to inputs to a neural network when utilizing the neural network to predict a voltage to generate the at least one of the cancellation wave, the subharmonic wave and the superharmonic wave.

18. A non-transitory computer-readable medium for controlling waves, including instructions that, when executed by one or more processors, cause the one or more processors to:

detect, with a plurality of sensors attached to a plurality of beams, a fundamental incident wave propagating in the plurality of beam;

determine, based on signals from the plurality of sensors generated in response to the fundamental incident wave, a frequency of the fundamental incident wave; and control a plurality of actuators connected to the plurality of beams to generate at least one of a cancellation wave, a subharmonic wave, and a superharmonic wave, based on the frequency of the fundamental incident wave.

19. The non-transitory computer-readable medium according to claim 18, wherein the instructions that, when executed by one or more processors, cause the one or more processors to generate at least one of the subharmonic wave and the superharmonic wave, based on the frequency of the fundamental incident wave, after generating the cancellation wave.

20. The non-transitory computer-readable medium according to claim 18, wherein the instructions that, when executed by one or more processors, cause the one or more processors to add a time delay to inputs to a neural network when utilizing the neural network to predict a voltage to generate the at least one of the cancellation wave, the subharmonic wave and the superharmonic wave.

* * * * *